United States Patent
Ballard et al.

(10) Patent No.: US 7,972,422 B2
(45) Date of Patent: Jul. 5, 2011

(54) SYSTEM FOR CONTINUOUS REMOVAL OF A SPECIFIC GAS FROM A FLOWING MIXTURE OF GASES

(75) Inventors: Gary L. Ballard, Victor, NY (US); David J. Ranelli, W. Henrietta, NY (US); Diane M. England, Bloomfield, NY (US); Malcolm James Grieve, Fairport, NY (US); Yee Ho Chia, Troy, MI (US); Galen B. Fisher, Bloomfield Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 982 days.

(21) Appl. No.: 11/804,885

(22) Filed: May 21, 2007

(65) Prior Publication Data

US 2008/0292923 A1      Nov. 27, 2008

(51) Int. Cl.
*B01D 53/06*      (2006.01)
(52) U.S. Cl. .............. 96/125; 96/130; 96/154; 423/230; 429/411
(58) Field of Classification Search .................... 96/125, 96/130, 144, 150, 154; 95/113, 136, 148; 423/230, 244.01, 244.02; 429/410, 411
See application file for complete search history.

(56) References Cited

U.S. PATENT DOCUMENTS

| | | | |
|---|---|---|---|
| 4,452,612 A | | 6/1984 | Mattia |
| 4,816,353 A | * | 3/1989 | Wertheim et al. ............. 429/410 |
| 5,385,603 A | * | 1/1995 | Sienack .......................... 96/125 |
| 6,406,522 B1 | * | 6/2002 | McFadden et al. .............. 95/113 |
| 6,689,194 B2 | * | 2/2004 | Pratt et al. ......................... 95/139 |
| RE38,893 E | * | 11/2005 | Fujimura ........................ 95/113 |
| 2001/0023640 A1 | | 9/2001 | Keefer et al. |
| 2002/0041842 A1 | * | 4/2002 | Ruettinger et al. ........... 423/230 |
| 2004/0179998 A1 | | 9/2004 | Gittleman et al. |
| 2009/0258264 A1 | * | 10/2009 | Ballard et al. .................. 429/19 |

FOREIGN PATENT DOCUMENTS

WO      0183365      11/2001

OTHER PUBLICATIONS

EP Search Report dated Oct. 10, 2008.

* cited by examiner

*Primary Examiner* — Frank M Lawrence
(74) *Attorney, Agent, or Firm* — Thomas N. Twomey

(57) ABSTRACT

A system comprising a cylindrical housing containing a sorbent cartridge selective of one or more gases in a gaseous mixture. End caps on opposite ends of the housing seal to the ends of the cartridge and direct the flow of gas mixture through a portion of the cartridge. The first end cap has entrance and exit ports for the gas mixture and for a purging gas for cartridge regeneration. The second end cap includes a compartment to receive and return the gas mixture to the first cap exit port. The purging gas follows a similar pathway via the remaining portion of the cartridge. The cartridge is rotatable within the housing; thus, the exhausted portion of the medium may be rotated into position for regeneration while a regenerated portion of the medium is rotated into position for re-use, thus providing continuous adsorption from the gas mixture.

1 Claim, 4 Drawing Sheets

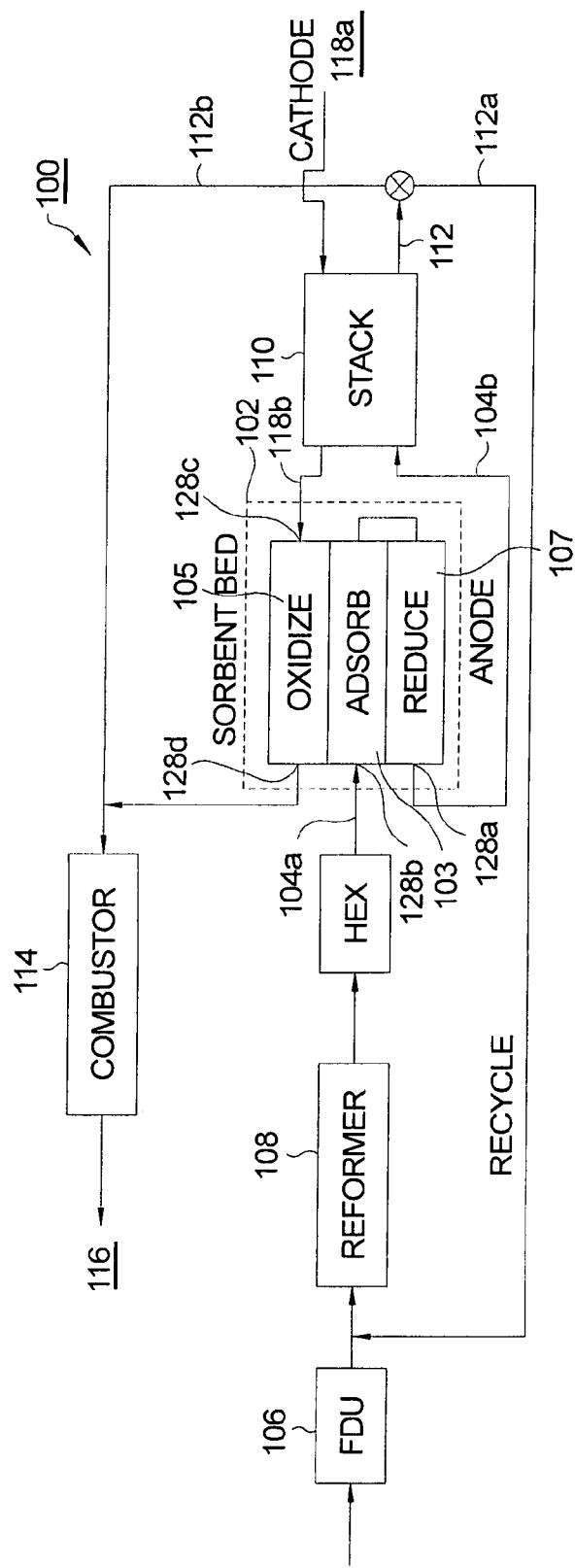
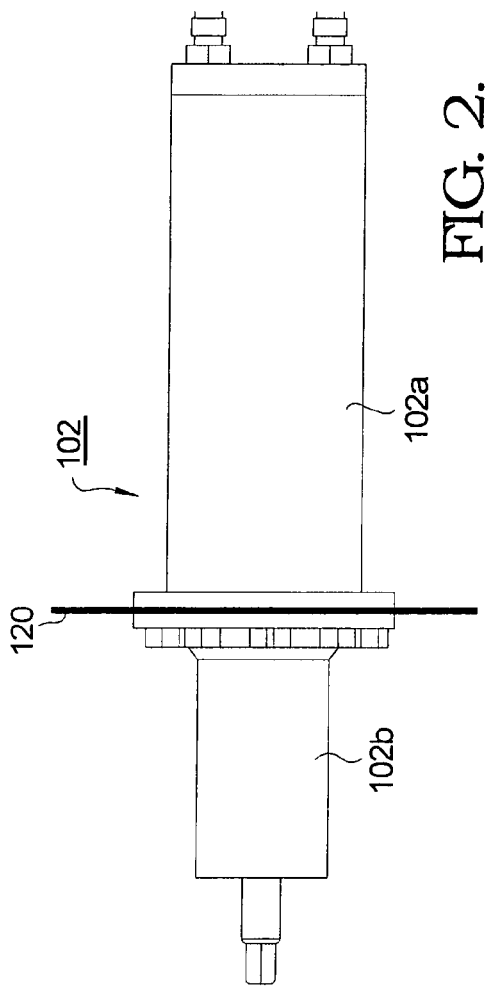

US 7,972,422 B2

SYSTEM FOR CONTINUOUS REMOVAL OF A SPECIFIC GAS FROM A FLOWING MIXTURE OF GASES

This invention was made with United States Government support under Government Contract/Purchase Order No. DE-FC36-04GO14319. The Government has certain rights in this invention.

TECHNICAL FIELD

The present invention relates to a mechanism for sorption of gases; more particularly, to devices for selectively removing a given gas species by adsorption from a stream comprising a plurality of gas species; and most particularly, to method and apparatus for continuously removing hydrogen sulfide from a high temperature mixed gas stream such as hydrocarbon catalytic reformate.

BACKGROUND OF THE INVENTION

In some known industrial processes, it is desirable or necessary to selectively remove a gas species from a flowing mixture of gas species. Such removal is typically carried out by passing the flowing mixture over a specifically adsorptive material deposited on a substrate having a high surface area. Typically, the adsorption capacity of the adsorptive material is finite and thus requires periodic reversal, or "regeneration", to become effective again.

In some known adsorption cycles, the adsorber may be desorbed of gas simply by being flushed with air, whereby the adsorbed gases are removed and exhausted with the flushing air to atmosphere. In some of these cycles, the adsorber is required to be in a chemically reduced state and thus a second, reducing process must be applied to the adsorber after oxidation by air flushing.

A problem in the prior art is how to configure for continuous adsorbing operation a selective gas adsorber requiring both air flushing and adsorber reducing steps for complete regeneration of the adsorber.

An additional prior art problem is how to perform such an operation at elevated temperatures of the gases in the range of 500° C. to 1000° C. Providing continuous, non-degraded performance of a gas adsorber at such temperatures is a severe materials challenge.

A specific application of such an adsorption need is in the removal of $H_2S$ from the hydrocarbon reformate stream being supplied from a catalytic reformer to a solid oxide fuel cell (SOFC) stack. Several hydrocarbon fuels that are otherwise useful in such a system for generating hydrogen and carbon monoxide reformate fuels for the SOFC contain significant percentages of elemental sulfur and/or sulfur-based compounds which are converted in the reformer in $H_2S$. Examples of such fuels are diesel fuel and JP8 jet fuel. Unfortunately, the anodes of present-day SOFCs are highly sensitive to $H_2S$, and are substantially degraded by continuous exposure to $H_2S$ levels in the reformate of 2 parts per million (ppm) and thus in practice are limited to low-sulfur gasolines, alcohols, and de-sulfured natural gas as reformable fuels. (Because natural gas is colorless, odorless, and tasteless, a mercaptan is added before distribution to give it a distinct unpleasant odor that serves as a safety device by allowing it to be detected by human olfaction in the atmosphere in cases where leaks occur. In being reformed, the mercaptan also produces $H_2S$.)

What is needed in the art is a continuous selective gas adsorption system having both oxidative and reductive capabilities of an adsorbing medium and being capable of sustained operation at high temperatures.

It is a principal object of the present invention to continuously remove hydrogen sulfide from a hydrocarbon reformate stream.

SUMMARY OF THE INVENTION

Briefly described, a system in accordance with the invention comprises a cylindrical housing containing a longitudinally-porous sorbent cartridge selective of one or more gases in a gaseous mixture. End caps on opposite ends of the housing seal to the ends of the cartridge and also direct the flow of gas mixture through the device. A first end cap is provided with entrance and exit ports for the gas mixture, and entrance and exit ports for a purging gas for regeneration of the medium. The second end cap is not ported but includes radial ribs forming a chamber that receive the gas mixture entered at the first cap and returns it to the exit port at the first end cap via a rotationally adjacent portion of the medium. The purging gas follows a similar pathway via the remainder of the cylindrical medium. The medium is rotatable within the housing against the first end cap. Thus, the exhausted portion of the medium may be rotated into position for regeneration while a regenerated portion of the medium is rotated into position for re-use, thus providing continuous adsorption from the gas mixture. The rotation may be stepwise or continuous.

BRIEF DESCRIPTION OF THE DRAWINGS

The present invention will now be described, by way of example, with reference to the accompanying drawings, in which:

FIG. 1 is a schematic drawing of gas flow paths through a system in accordance with the invention, which system is adapted specifically for both oxidative and reductive regeneration;

FIG. 2 is a side view of a system in accordance with the invention;

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 3:
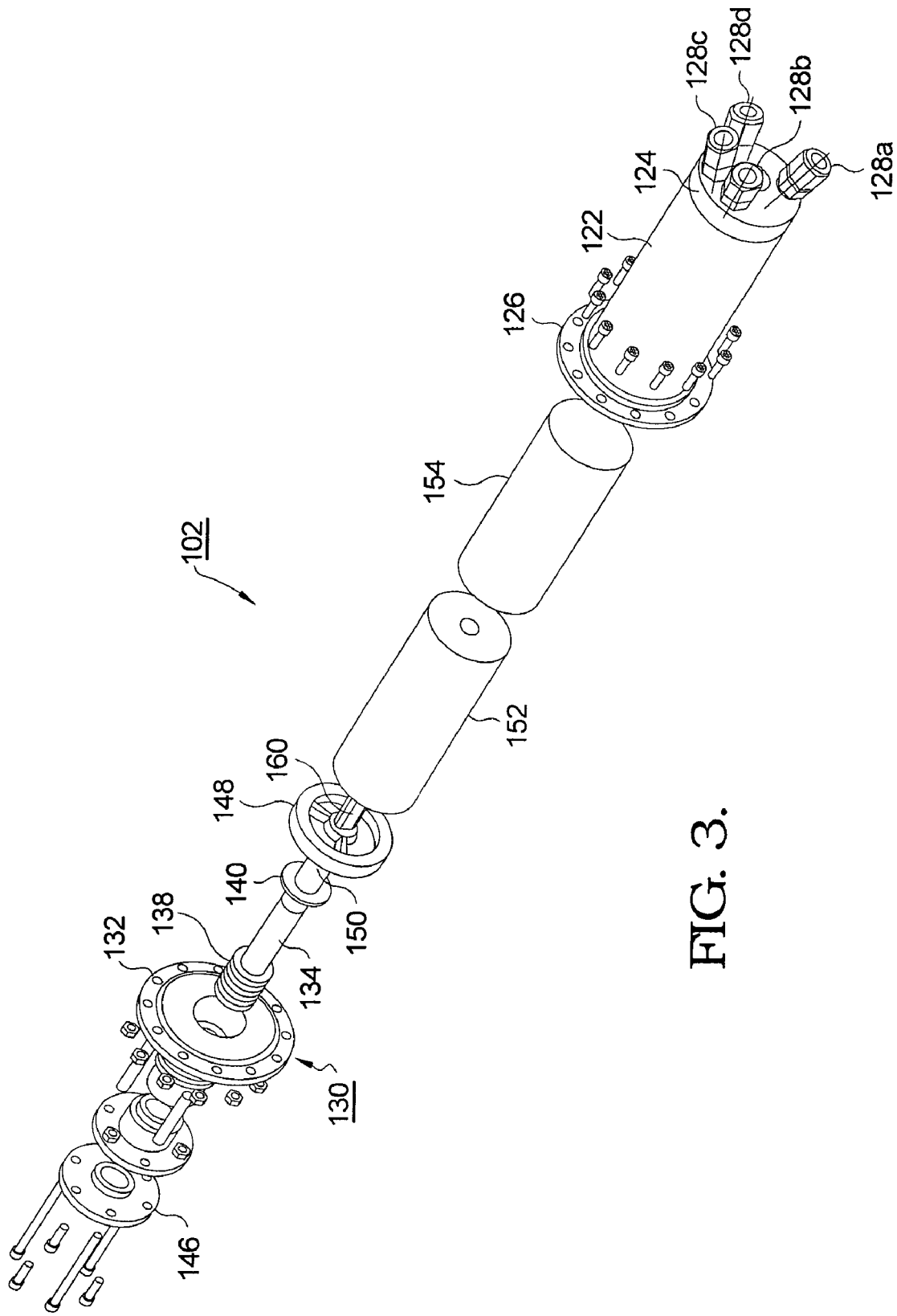
FIG. 3 is an exploded isometric view of the system shown in FIG. 2.
Figure 4:
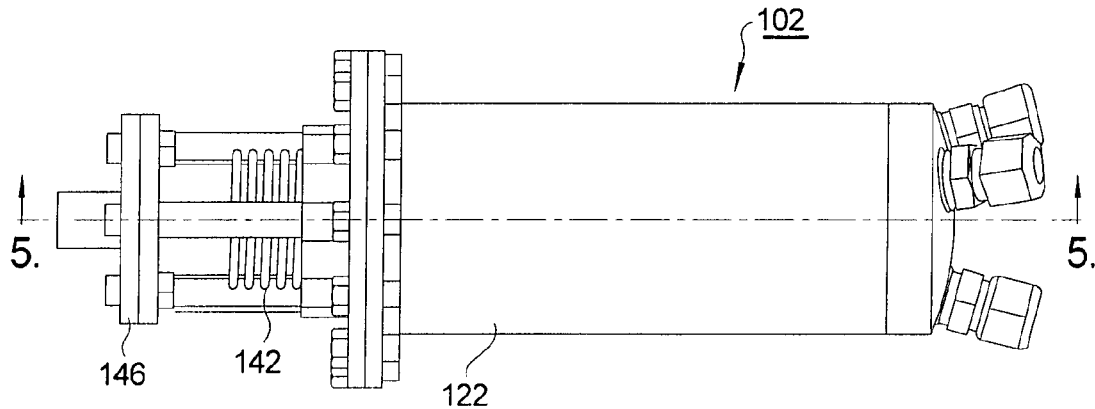
FIG. 4 is a second longitudinal view of a system in accordance with the invention.
Figure 5:
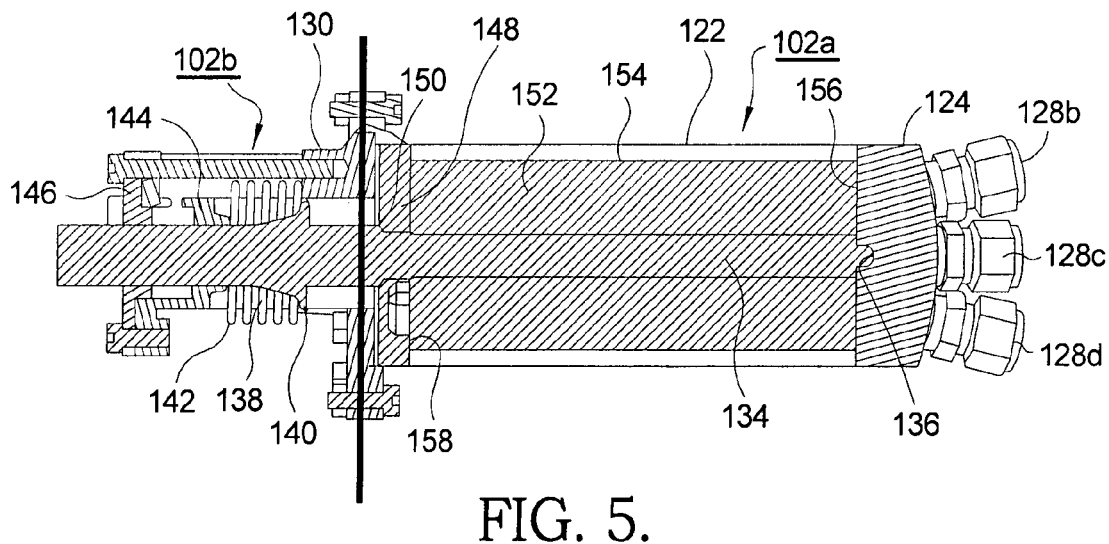
FIG. 5 is a first longitudinal cross-sectional view taken along line 5-5 in FIG. 4.

Referring to FIG. 1, a schematic flow chart 100 is shown for use of a gas-adsorption system 102, such as shown in FIG. 2, in accordance with the invention, exemplarily employed in the present example as an $H_2S$ scrubber in a reformate gas stream 104a being generated from sulfur-containing hydrocarbon fuel 106 by catalytic reformer 108 for supplying sulfur-free reformate fuel 104b to the anode of a solid oxide fuel cell stack 110. Anode tailgas 112 is divided, a first portion 112a being recycled into the intake of reformer 108 and a second portion 112b being sent to combustor 114 for burning and discharge to atmosphere 116. Fresh air 118a is supplied to the cathode of stack 110, and heated cathode exhaust air 118b is directed through system 102 and thence to combustor 114 where it is combined for combustion with second anode tailgas portion 112b.

Still referring to FIG. 1, it is seen that system 102 comprises three treatment sections: a selective adsorbing section 103, an oxidative regeneration section 105, and a reductive regeneration section 107. For removing $H_2S$ from a gas stream such as reformate 104a in section 103, an excellent adsorbing medium is nickel stabilized with a rare earth metal; however, in regeneration of the medium by the passage of air 118b through section 105 the medium becomes oxidized and therefore must be chemically reduced in reductive section 107 prior to being used again for adsorption in section 103. In dealing with reformate, as in the present example, the reformate itself is a highly reducing composition, comprising a high percentage of elemental hydrogen; thus, the reformate upon leaving adsorption section 103 is simply directed back through section 107 where the reformate reduces the nickel catalyst prior to being sent to SOFC 110 as fuel 104b. Obviously, in other applications of a continuous adsorption system in accordance with the invention, other means for reducing the nickel catalyst will occur to those of ordinary skill in the art and such other means are fully comprehended by the invention. In the present application, however, reformate is a convenient reductant.

Referring to FIG. 2, system 102 comprises a gas-treating portion 102a and a rotary actuator portion 102b for rotating a cartridge within a housing. In high-temperature applications, such as in the desulfurizing of hot reformate, portion 102a must necessarily be disposed in an overall high-temperature environment, for example, 500-1000° C.; however, the rotary actuator is preferably placed in a cooler environment outside of the hot zone (which typically contains the SOFC stack 110 as well). Hence, in a currently-preferred embodiment 102, portions 102a and 102b are separated by an insulative barrier 120, and only an actuator shaft extends through barrier 120 to rotate the portion 102b as described below.

Referring now to FIGS. 3 through 10, system 102 comprises a cylindrical housing 122 having an integral first end cap 124 at a first end and a first flange 126 at the opposite end. First end cap 124 is provided with nippled ports 128a, 128b as entrance and exit ports respectively for reformate to be desulfurized, and with nippled ports 128c, 128d as entrance and exit ports for oxidative regeneration of the medium by flow of air. Second end cap 130 comprises a second flange 132 for matably sealing to first flange 126. An actuator shaft 134 extends through a central opening in second end cap 130 and is rotatably supported at a distal end thereof in a socket 136 formed in first end cap 124. Shaft 134 is urged into socket 136 by a bias spring 138 operative against a shaft flange 140 and retained within a dynamically-sealing bellows 142 by a packing gland 144 and packing flange 146. A gas flow disk 148 is disposed on shaft 134 and is engaged in non-rotating relationship within housing 122, permitting shaft 134 to be rotated through disk 148. Preferably, shaft 134 includes a shoulder 150 for axially engaging flow disk 148 to urge the disk toward first end cap 124.

A gas-adsorbing cartridge 152 is disposed within a cylindrical shell 154, and both are disposed within housing 122 in rotational sealing relationship between inner face 156 of first end cap 124 and inner face 158 of flow disk 148. Cartridge 152 is supported on a portion 160 of shaft 134 having flats or other means for engaging cartridge 152. Thus, cartridge 152 may be rotated relative to end cap face 156 and flow disk face 158 by rotation of shaft 134 by a rotary actuator 135 during operation of system 102 as described below.

First end cap 124 is provided with a plurality of compartments 162a-162d in respective communication with ports 128a-128d and cartridge 152, the compartments being defined by separating ribs 164. Similarly, flow disk 148 is provided with a plurality of blind compartments 166a-166b in communication with cartridge 152 and defined by separating ribs 168.

Cartridge 152 is longitudinally permeable and circumferentially impermeable, and preferably is formed of a plurality of tubules or channels extending between first end cap 124 and flow disk 148. A currently preferred cartridge is a honeycomb monolith formed preferably of ceramic and having a high surface area coated with nickel catalyst doped with rare earth metal for adsorption of $H_2S$ as described above. Such a cartridge is available from TDA Research, Inc., Wheat Ridge, Colo., USA.

In operation of system 102, and referring now to FIGS. 1-10, gaseous reformate 104a containing $H_2S$ is entered into cartridge 152 via port 128b and flows through longitudinal channels of cartridge 152 aligned with compartment 162b and compartment 166b. Compartment 166b acts as a plenum to distribute the reformate over a large percentage of the cross-sectional area of cartridge 152 commensurate with compartment 166b. The reformate flow is returned to compartment 162a where it is gathered and directed via port 128a to the anode of SOFC 110. During passage through the channels aligned with compartments 162b, 162a, 166b, $H_2S$ in the reformate is adsorbed onto the catalyst of those channels. Preferably the concentration of $H_2S$ is reduced thereby from approximately 2 ppm or greater to 10 ppb or less, depending upon the size of system 102 and the flow rate of reformate. For example, a system having a volume of 3 liters supplying reformate to an SOFC operating at maximum power flow can desulfurize a reformate flow rate of about 18 liters per second. Preferably a sulfur sensor 178 is provided in compartment 162a to alarm in the event of desulfurizing failure of system 102 and to prevent thereby sulfur contamination of the anode in SOFC 110. Within the scope of the invention, reformate flow may be directed in either direction through ports 128a, 128b.

Synchronous with the just-described desulfurizing process, air (preferably heated air 118b exhausted from the SOFC cathode) is directed into port 128c and thence into cartridge channels aligned with compartments 162c, 162d, 166a. The air flows along the length of the cartridge through channels aligned with compartment 162c, is turned in compartment 166a, flows back through parallel channels aligned with compartment 162d, and is gathered and directed via port 128d to combustor 114. The air flowing through these channels strips the adsorbed $H_2S$ from the catalyst and carries it to the combustor. In the process, the catalyst is reversibly oxidized. Within the scope of the invention, air flow may be directed in either direction through ports 128c, 128d.

Figure 6:
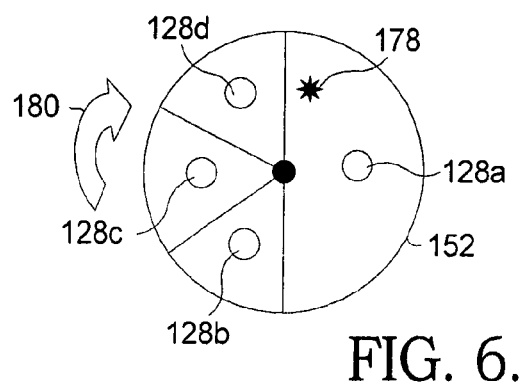
FIG. 6 is an idealized cross-sectional view of a cartridge in accordance with the invention, showing functional partitioning thereof.
Figure 8:
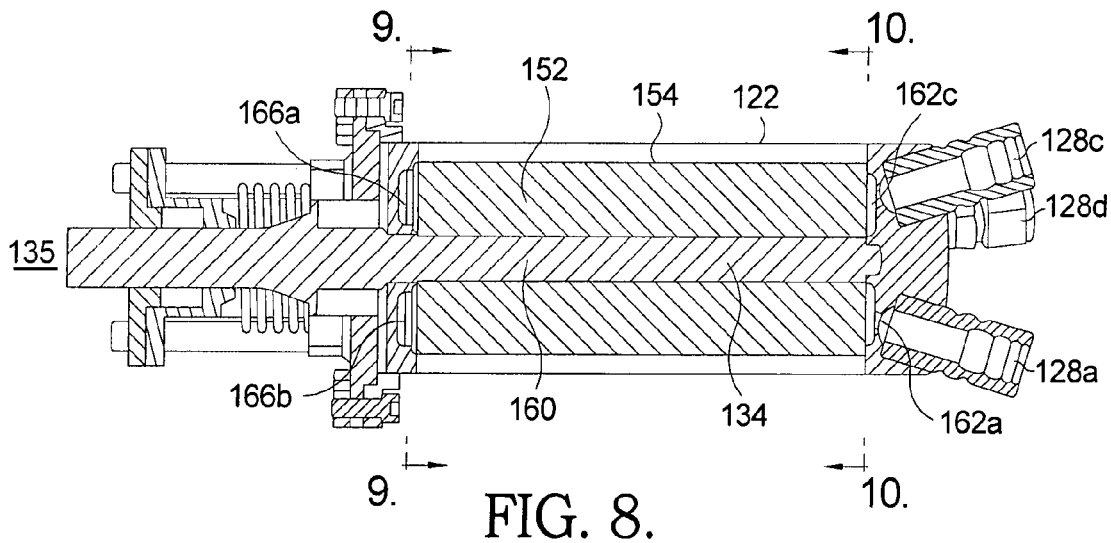
FIG. 8 is a second longitudinal view taken along line 8-8 in FIG. 7.
Figure 9:
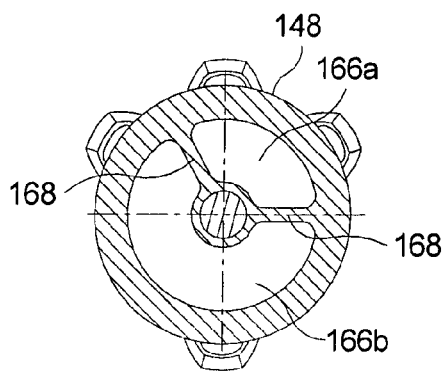
FIG. 9 is a cross-sectional view taken along line 9-9 in FIG. 8.
Figure 7:
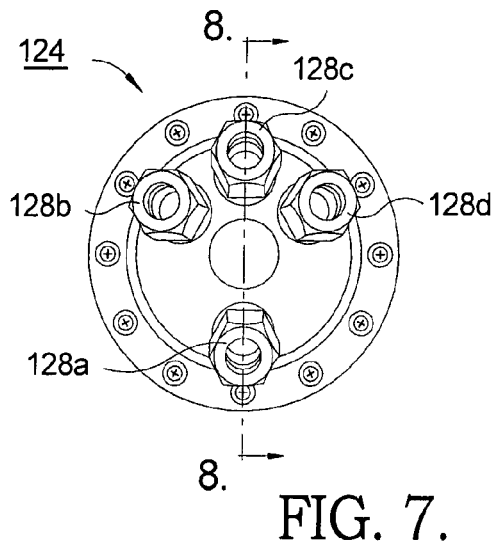
FIG. 7 is a plan view of a first end cap of the system shown in FIG. 2.
Figure 10:
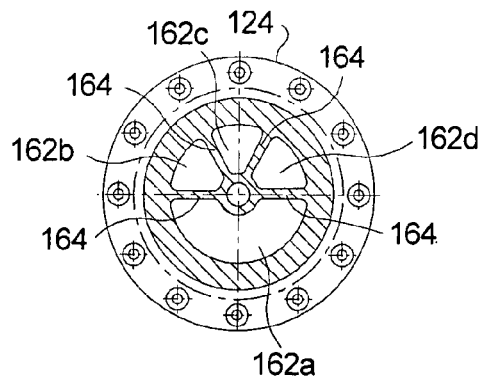
FIG. 10 is a cross-sectional view taken along line 10-10 in FIG. 8.

During operation of system 102, cartridge 152 is rotated between first end cap 124 and flow disk 132 by rotation of shaft 134 in the direction 180 shown in FIG. 6. Rotation may be stepwise or continuous. An exemplary system requires a rotation rate of about 1 revolution per hour. It will be seen that rotation causes a) adsorber catalyst carrying adsorbed $H_2S$ to be exposed to air flow that purges the $H_2S$ from the medium and also oxidizes the medium; b) oxidized catalyst to be exposed again to reducing reformate that reduces the oxidized catalyst and converts the oxide to water which is carried beneficially into the SOFC with the desulfurized reformate. As the oxidized catalyst is progressively reduced by reformate it becomes capable again of adsorbing $H_2S$, continuing the adsorption/regeneration cycle.

Thus, a system in accordance with the invention is capable of continuously selectively adsorbing a specific gas entity from a mixture of gases, and is especially useful in continuously desulfurizing reformate derived from hydrocarbon fuels containing sulfur.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A system for continuous adsorption of a given gas species from a flowing mixture of gas species, comprising:

a) a housing having first and second end plates disposed at opposite ends thereof, wherein at least one of said first and second end plates includes a plurality of ports for entrance and exit of said flowing mixture of gas species and for entrance and exit of at least one flowing regenerative gas species;

b) a reversibly adsorptive medium rotatably disposed within said housing between said first and second end plates; and c) a rotator for rotating said reversibly adsorptive medium into and out of selective communication with said entrance and exit ports for said at least one flowing regenerative gas species and said entrance and exit ports for said flowing mixture of gas species;

wherein said reversibly adsorptive medium comprises an inert substrate formed as a plurality of channels extending longitudinally of said substrate and wherein walls of said channels are covered by a material reversibly adsorbent of said given gas species, and wherein said material reversibly adsorbent of said given gas species includes nickel and a rare earth element.

\* \* \* \* \*